Jan. 15, 1924.
A. E. BUCHENBERG
1,481,184
CURRENT REGULATION
Original Filed Sept. 9, 1918
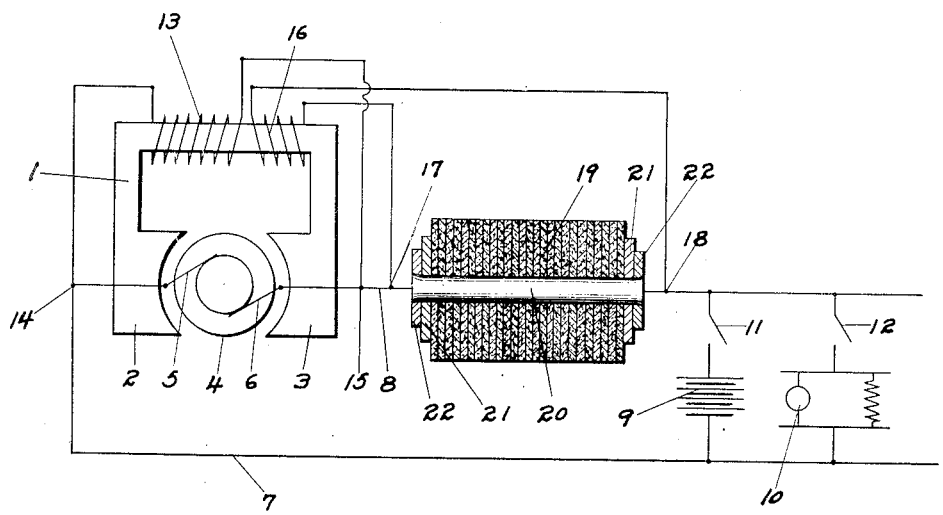
Inventor
Alvin E. Buchenberg
By Chester F Braselton
Attorney Patented Jan. 15, 1924.

1,481,184

UNITED STATES PATENT OFFICE.

ALVIN E. BUCHENBERG, OF TOLEDO, OHIO, ASSIGNOR TO INDUSTRIAL RESEARCH CORPORATION, OF TOLEDO, OHIO, A CORPORATION OF DELAWARE.

CURRENT REGULATION.

Application filed September 9, 1918, Serial No. 253,261. Renewed May 25, 1923.

*To all whom it may concern:*

Be it known that I, ALVIN E. BUCHENBERG, a citizen of the United States, residing at Toledo, in the county of Lucas and State of Ohio, have invented certain new and useful Improvements in Current Regulation, of which I declare the following to be a full, clear, and exact description.

This invention relates to a system of control for a dynamo electric machine.

An object of the invention is to provide effective means for maintaining the current in the service mains of the dynamo electric machine, below a maximum value, irrespective of the speed rotation of the armature of the machine.

Another object is to provide a type of regulation for controlling the current in a dynamo electric machine, which will be applicable to a system in which there is no battery floating upon the line.

A further object is contemplated in the utilization of a control unit which will be entirely automatic in operation.

Further objects of this invention relate to economies of manufacture and details of construction as will hereinafter appear from the detailed description to follow. I accomplish the objects of my invention in one instance by the devices and means described in the following specification, but it is evident that the same may be varied widely without departing from the scope of the invention as pointed out in the appended claims. A structure constituting one embodiment of my invention, which may be the preferred, is illustrated in the accompanying drawings forming a part thereof, in which:

The single figure of the drawing is a diagrammatic representation embodying my invention.

As illustrated, I employ a dynamo electric machine 1, which, for the sake of convenience, is illustrated as a two pole machine with field poles 2 and 3. Bearing on the commutator of the armature 4 are the main brushes 5 and 6 and to these main brushes are connected the service mains 7 and 8. Various load elements, herein illustrated as a storage battery 9 and lamp 10, are connected across the mains through switches 11 and 12.

The field poles of the machine are excited by means of a shunt winding 13, which has its terminals connected to the mains at points 14 and 15. I also place on the field poles, a second winding 16, which has a normal magnetic polarity opposed to the shunt field winding. The terminals of this second winding 16 are connected to the service main 8, at points 17 and 18.

Interposed in the service mains 8, between the connecting points 17 and 18 of the opposed shunt winding or bucking coil 16, I insert a resistance and controlling element 19, the details of which will now be described.

The unit 19 is built on a central metallic core 20, which carries along its length, a series of carbon discs which are appropriately apertured at their centers, so as to fit closely over the metal core. Adjacent the terminals of the rod 20 are placed metallic washers 21 and 22, and the ends of the core are swaged outwardly at their edges, holding the washers firmly in position and preventing their outward removal.

The number of carbon discs is such that in the assembled unit they are under more or less compression, so that they are susceptible to changes in the length of the central core 20 due to any physical causes. In addition, the core 20 is made of a metal in which the co-efficient of thermal expansion is relatively high, so that it is easily susceptible to small changes in temperature.

In operation, the regulation of the generating system is attained as follows: For low speeds of the generator and consequent low current output, current approaching the junction point 17 of the service main 8, passes readily through the rod 20, since the current is insufficient to heat this rod to any extent, and through the carbon discs 19 which are under compression and have, therefore, relatively high conductivity. In consequence, the current passing through the bucking coil 16 will be relatively small and the regulating effect of this coil on the shunt coil 13 will also be small.

As the current in the mains increases, the heating effect in the rod 20 which varies as the square of the current, increases rapidly, the result of this increasing temperature of the rod 20 being to cause a linear expansion of the rod which will tend to lessen the compression of the end washers 21 upon the carbon discs, thereby increasing the resistance of the whole carbon pile. This will tend to force the current out of the carbon pile into the rod 20, which will further increase the temperature of the rod 20, and increase its linear expansion.

The final effect of the large increase of the resistance of the unit, 19, will be to send the current into the path of lesser resistance through the bucking coil 16, and as the electro-magnetic effect of this coil opposes that of the coil 13, the resultant magnetic induction of the field poles 2 and 3 will be decreased, thus decreasing the voltage of the machine and holding the current in the mains at a reasonable value.

From the above, it is evident that at low speeds the dynamo acts approximately as a shunt wound machine, but at the higher speeds, as a differentially wound machine, and that this regulation is attained by means entirely automatic in nature, and in a compact and rugged unit.

I am aware that the particular embodiment of my invention, as here shown and described, is susceptible of considerable variation, without departing from the spirit of my invention, and, therefore, I desire to claim the same broadly, as well as specifically, as indicated by the appended claims.

Having thus described my invention, what I claim as new and desire to secure by Letters Patent, is:

1. In an electric system, the combination of a generator, including armature, brushes, and field poles; service mains connected to said brushes; a shunt field winding connected to said service mains, having a given normal polarity of magnetic action; a second field winding having a normal magnetic polarity opposed to said first named shunt winding; and a combined resistance unit in series with the service mains and in circuit with the second named field winding, said unit having a binding means and a resistance element clamped thereby, the co-efficient of expansion of the binding means being greater than that of the resistance element.

2. In an electric system, the combination of a generator including armature, brushes, and field poles; service mains connected to said brushes; a storage battery connected to said mains; a shunt field winding connected to said service mains, having a given normal polarity of magnetic action; a second field winding having a normal magnetic polarity opposed to said first named shunt winding; and a combined resistance unit in series with the service mains and in circuit with the second named field winding, said unit having an inner binding element, and an outer resistance element clamped thereby, the expansion of the inner element varying approximately as the square of the current flowing therethrough.

3. In an electric system, the combination of a generator adapted to be driven at a variable speed and including armature, brushes, and field poles; service mains connected to said brushes; a storage battery in circuit with said mains; a shunt field winding connected to said service mains, having a given normal polarity of magnetic action; a second field winding having a normal magnetic polarity opposed to said first named shunt winding; and a combined resistance unit in series with the service means and in a parallel circuit with the second named field winding, said unit having an inner binding element, and an outer resistance element clamped thereby, the expansion of the inner element varying approximately as the square of the current flowing therethrough, whereby the resistance of the outer element increases more rapidly than the resistance of the inner element.

4. In an electric system, the combination of a generator including armature, brushes, and field poles; service mains connected to said brushes; a shunt field winding connected to said service mains, having a given normal polarity of magnetic action; a second field winding having a normal magnetic polarity opposed to said first named shunt winding; and means varying approximately as the square of the current in the mains for increasing the current in the second named field winding as the load current increases.

5. In an electric system, the combination of a dynamo electric machine, and means for regulating the current thereof, comprising a series of contacting members, and a binding member therefor, said binding member being in electrical circuit with said contacting members, and having a relatively greater co-efficient of expansion than said contacting members.

6. In an electric system, the combination of a dynamo electric machine, and means for regulating the current thereof, comprising a series of contacting carbon members, and a binding member therefor, said binding member being in electrical contact with the carbon members, and having a higher co-efficient of expansion than the carbon members.

7. In an electric system, the combination of a dynamo electric machine, and means for regulating the current thereof, comprising a series of carbon discs, and a binding member therefor, comprising a rod projecting through the discs and in electrical contact therewith, and having a higher co-efficient of expansion than the carbon discs.

8. In an electrical system, the combination of a dynamo electric machine, and means for regulating the current thereof, comprising a series of engaging members, and a binding member therefor, in electrical contact therewith, and having a higher co-efficient of expansion than the engaging members.

9. In an electric system, the combination of a generator including armature, brushes, and field poles; service mains connected to said brushes; a shunt field winding connected to said service mains, having a given normal polarity of magnetic action; a second field winding having a normal magnetic polarity opposed to said first named shunt winding; and a regulator comprising a series of carbon discs and binding means therefor, having a higher co-efficient of expansion than the carbon discs, the discs and binding means being in parallel with each other and connected in series only with the service mains.

In testimony whereof, I affix my signature.

A. E. BUCHENBERG.